United States Patent [19]

van Zon et al.

[11] Patent Number: 4,514,302
[45] Date of Patent: Apr. 30, 1985

[54] NON-WOVEN TUBE FOR MEMBRANE FILTRATION

[75] Inventors: Cornelis van Zon, Zwolle; Gerrit J. Jonkeren; Hilbert Eggengoor, both of Bruchterveld, all of Netherlands

[73] Assignee: Wafilin B.V., Zwolle, Netherlands

[21] Appl. No.: 449,318

[22] Filed: Dec. 13, 1982

[30] Foreign Application Priority Data

Dec. 14, 1981 [NL] Netherlands .......................... 81 05621

[51] Int. Cl.$^3$ ............................................. B01D 39/14
[52] U.S. Cl. .................................. 210/433.2; 210/491; 210/508; 210/509; 55/158
[58] Field of Search ............... 210/490, 491, 506, 508, 210/509, 323.2, 433.2, 497.01, 497.1; 55/512, 513, 514, 524, 486, 487, 498, 502, 158

[56] References Cited

U.S. PATENT DOCUMENTS

| | | | |
|---|---|---|---|
| 2,834,730 | 5/1958 | Painter et al. | 210/491 |
| 3,442,392 | 5/1969 | Skelley | 210/491 |
| 3,457,170 | 7/1969 | Havens | 210/490 |
| 3,850,203 | 11/1974 | Shobert | 210/490 |
| 3,912,834 | 10/1975 | Imai et al. | 210/490 |
| 4,214,612 | 7/1980 | de Putter | 210/500 |

FOREIGN PATENT DOCUMENTS

| | | | |
|---|---|---|---|
| 2276860 | 1/1976 | France . | |
| 2380129 | 9/1978 | France . | |
| 2477962 | 9/1981 | France . | |
| 7612347 | 5/1978 | Netherlands | 210/490 |
| 1256491 | 12/1971 | United Kingdom . | |

Primary Examiner—Richard V. Fisher
Assistant Examiner—Wanda L. Millard
Attorney, Agent, or Firm—Wilkinson, Mawhinney & Theibault

[57] ABSTRACT

A composite tube of a heat-sealable non-woven material comprises an inner and an outer tube of non-woven, each of said tubes being provided with a longitudinal seal obtained by ultrasonic sealing, the outer and inner tube being fixed with respect to each other by adhesive spots. The inner side of the inner non-woven tube is coated with a membrane for membrane filtration.

The seal formed by ultrasonic sealing in the outer tube does not extend to the inner side of the inner tube and preferably the seals in the outer and inner tube are staggered with respect to each other.

The composite tube is formed by first forming the inner tube, applying spots of an adhesive upon the outer side of the inner tube, and subsequently applying the outer tube onto the inner tube. During the step of forming the longitudinal seal by ultrasonic sealing in the outer tube it is avoided that the seal as formed extends toward the inner side of the inner tube.

5 Claims, 3 Drawing Figures

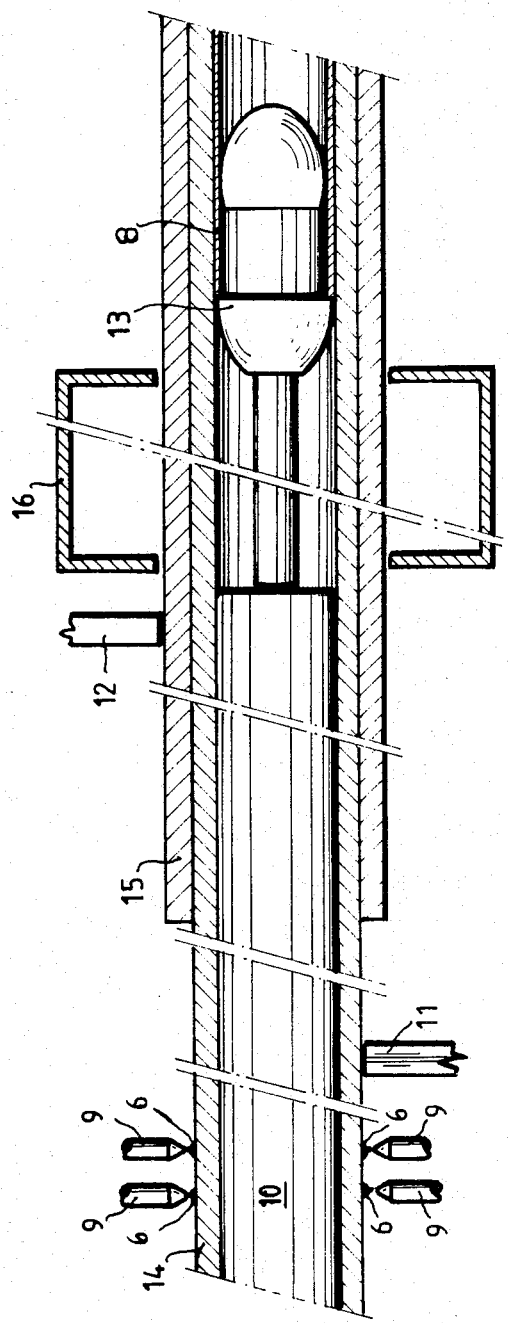

NON-WOVEN TUBE FOR MEMBRANE FILTRATION

BACKGROUND OF THE INVENTION

1. Field of the invention

The present invention relates to a tube of non-woven material made from a heat-sealable non-woven and comprising a longitudinally extending connecting seal, more particularly a longitudinal seal obtained by ultrasonic sealing.

2. Description of the Prior Art

Such tubes of non-woven material for supporting a membrane for membrane filtrations are known in the art.

Known tubes of non-woven material comprising a connecting seal are inconvenient as a crack in the membrane may occur in the region of the provided longitudinal seal in case that the latter has not been applied in a careful and accurate manner. Actually a membrane in such a tube of non-woven material is subjected to a high internal pressure during a membrane filtration, which pressure may give rise to slight expansions of the membrane so that, especially in the regions where the fibers of the non-woven are sealed to each other, cracks may occur in said membranes so that they have to be discarded.

As already mentioned hereinbefore the application of a longitudinal seal has therefor to meet rather high critical demands as otherwise interruptions may occur in the apparatus having high production speeds.

It is an additional drawback of this known tube of non-woven material that the use of rather thin non-woven material causes the obtained tube to be relatively smooth which entails a difficult installment in an apparatus for membrane filtration in which such tubes of non-woven material comprising on their inner side a membrane are accommodated in a pressure-resistant support tube.

Other known tubes of non-woven material in which use is made of connecting strips obtained by employing an adhering means or glue have the drawback that a large strip of the non-woven becomes impermeable to liquids used in membrane filtrations.

SUMMARY OF THE INVENTION

The present invention aims to provide a tube of non-woven material which does not suffer from the aforementioned drawbacks.

More particularly the present invention aims to provide a tube of non-woven material which does not give rise to a crack formation in the membranes when subjecting the latter to high internal pressures and which tube moreover possesses a great rigidity and permeability to liquids.

This aim is achieved according to the invention in that a composite tube of non-woven material comprises an inner tube of non-woven material and another tube of non-woven material surrounding the former and comprising a longitudinally extending connecting seal, which innermost and outermost non-woven tubes are mutually fixed against shifting with respect to each other.

The use of an inner tube of non-woven material facilitates providing the outer tube of non-woven material with a longitudinal seal by ultrasonic sealing which seal need, however, not meet the critical demands as regards a membrane to be provided upon the inner tube of non-woven material.

Irregularities, if any, in a longitudinal seal in the outer tube of non-woven material and obtained by ultrasonic sealing, are incapable of directly impeding membranes provided in the tube of non-woven material, due to the presence of an additional inner tube of non-woven material between the membrane and the other tube of non-woven material. Said inner tube of non-woven material is also provided with a longitudinal seal but it will be clear that said longitudinal seal in the inner tube of non-woven material need not possess the strength necessary for obviating the high internal pressures to which the filtration membrane upon the inner tube of non-woven material is subjected.

The longitudinal seals obtained by ultrasonic sealing are preferably accomodated in the innermost and the other or outermost non-woven tube in a staggered manner with respect to each other, so that the outermost non-woven tube may be provided with a heavy longitudinal seal without any notable effect upon the non-woven layer of the innermost non-woven tube and a crack in the membrane is absolutely avoided.

The use of two tubes of non-woven material entails that the required mechanical strength can be obtained by applying a heavy longitudinal seal in the outermost tube of non-woven material while the use of a slight longitudinal seal in the innermost tube of non-woven material will not impair the membrane when the latter is subjected to high internal pressures.

The innermost and the outermost tubes of non-woven material are effectively locally interconnected, preferably by means of a glue melting in the presence of heat. In this manner the innermost tube of non-woven material can firstly be made and thereupon be surrounded by the outermost non-woven tube, both tubes being provided with a longitudinal seal obtained by ultrasonic sealing, whereupon the assembly is passed through an oven in order to melt the glue without disadvantageously influencing the fibers of the non-woven from which the tubes of non-woven material are made. It has been found that such tubes of non-woven material according to the invention are relatively rigid, notwithstanding the thin non-woven material and that they are more effective than tubes of non-woven material made from a non-woven having a total thickness which equals the thickness of the non-woven used for the present innermost and other tube of non-woven material.

Such a composite tube of non-woven material according to the invention additionally presents the advantage that the procedure of installing the membranes with the tubes of non-woven material in the supporting tubes, is facilitated which is especially of importance when applying new membranes in exchange for membranes to be discarded.

It has finally been found that the flux values or retention values of tubes of non-woven materials with membranes according to the invention offer favorable results compared with similar tubes of non-woven material comprising similar membranes and made from one single non-woven layer having the same thickness as the total layer of the present non-woven of the innermost tube of non-woven material and the other tube of non-woven material surrounding the latter.

The other or outermost tube of non-woven material is effectively thicker than the innermost tube of non-woven material so that an optimum protection against damages of the membrane and prevailing internal pressures is obtained. The ratio of the thickness of innermost tubes of non-woven material and outermost or other tubes of non-woven material is comprised between 1:1,0 and 1:3.

The longitudinal seal in the other tube of non-woven material can effectively be provided after the formation of the innermost tube of non-woven material so that, although a slight local melting of the non-woven of the innermost tube may occur, this will not give rise to irregularities or notable structural changes inherent with the formation of a longitudinal seal resistant to high pressures in a tube of non-woven material made from one single non-woven.

Besides the advantages of a good quality of a tube of non-woven material according to the invention, while maintaining less critical conditions during the formation of the longitudinal seal, and a better handling of such a tube of non-woven material even when the latter is wet, it should also be noted that the sensitivity to an implosion of the tube of non-woven material in the modules during the membrane filtration, is decreased with respect to a tube made of a single non-woven and comprising a longitudinal seal. It should be noted that a longitudinally extending connecting strip, more particularly a longitudinal seal obtained by ultrasonic sealing, can also be replaced by a connecting strip which helically extends. Longitudinal seals extending parallel to the tube axis are, however, preferred.

The present invention also relates to a method of making a tube of non-woven material according to the invention.

The invention finally relates to an apparatus for forming such a tube of non-woven material according to the invention.

The features of the present invention which are believed to be novel are set forth with particularity in the appended claims.

Other claims and many of the attendant advantages will be more readily appreciated as the same becomes better understood by reference to the following detailed description and considered in connection with the accompanying drawings in which like reference symbols designate like parts throughout the figures.

DESCRIPTION OF THE DRAWINGS

FIG. 3 is apparatus for forming a tube of non-woven material according to the invention;

DESCRIPTION OF THE PREFERRED EMBODIMENTS

Figure 1:
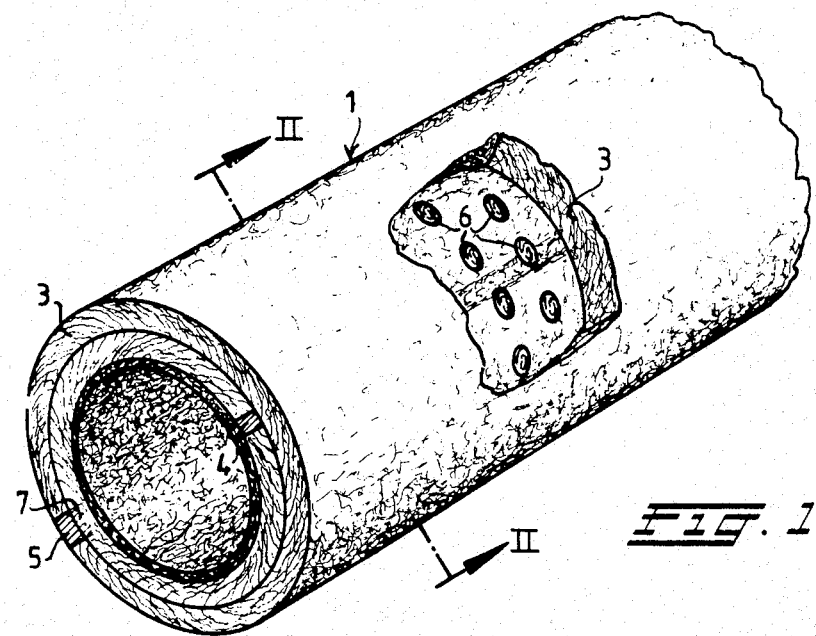
FIG. 1 is a perspective view of a tube of non-woven material according to the invention, parts of the outermost tube of non-woven material being removed.
Figure 2:
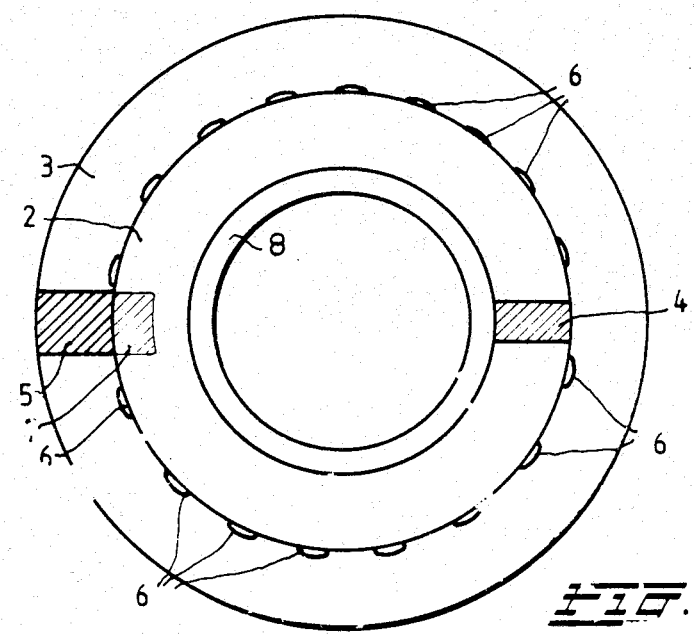
FIG. 2 is a section according to line II—II in FIG. 1.

Referring now to FIGS. 1 and 2, a tube of non-woven material according to the invention consists of an outermost non-woven tube 3 made from polyester fibers having a thickness of approximately 0.20 mm and provided with a longitudinal seal 5 obtained by ultrasonic sealing.

Within the other or outermost tube of non-woven material 3 an innermost tube of non-woven material 2 is provided also consisting of polyester fibers having a thickness of approximately 0.12 mm. Said innermost tube of non-woven material 2 can be formed by means of a longitudinal seal 4.

For mutually fixing the innermost and the outermost non-woven tubes 2 and 3 glue points 6 are provided which locally fix the tubes of non-woven material to each other.

Upon the innerside of the innermost tube of non-woven material 2 a membrane 8 of, for example, cellulose acetate, is provided for a membrane filtration process.

It will be obvious that the longitudinal seal 4 may be relatively weak as the strength required for the non-woven tube may be provided by the longitudinal seal 5 in the outermost or other tube of non-woven material 3. Due to the presence of the latter any chance of damaging the membrane 8 in case that the membrane is subjected to high internal pressures due to the structural change of the non-woven material of the longitudinal seal 4, will be rather slight.

Such a tube of non-woven material offers the great advantage that in case of a membrane exchange said tube can easier be replaced due to its greater rigidity, while yet the same quantity of non-woven is used as for a tube of non-woven material made from a non-woven with a thickness corresponding to the thickness of the non-wovens of the present innermost and other outermost tube of non-woven material 2,3, respectively.

Furthermore applying membranes in similar non-wovens is facilitated as the membrane need no longer be pulled into the tubes but may now also be pushed into the tubes. The latter is especially important when membranes are used upon tubes of non-woven which are stored as such, and are only installed in a pressure-resistant supporting tube in a latter stage.

Finally a tube of non-woven material according to the invention can be easier handled than a non-woven tube made of a single non-woven having the same thickness as the former.

It should finally be noted that the resistance to an external over-pressure of similar tubes of non-woven material is considerably greater than that of known tubes of non-woven material having a longitudinal seal and being provided with one single non-woven of the same thickness.

Since the longitudinal seal in the outermost tube of non-woven material 3 is applied after the formation of the innermost tube of non-woven material 2, the ultrasonic sealing for the formation of the longitudinal seal 5 will also give rise to a certain melting of the fibers forming the innermost tube of non-woven material, which will cause a melting region 7. As can be seen in the figures, said melting region does not extend to the innerside of the innermost tube of non-woven material and does not give rise to any damage of the respective membranes, which is supposedly inherent with the fact that the structure of said region 7 less differs from the non-woven than a similar region occurring when a single seal is used for forming the connection and obtaining the desired strenght of a longitudinal seal. This counts especially for the side of the non-woven upon which the the membrane is being applied.

In the aforedescribed example the longitudinal seals 4 and 5 have been applied in a way staggered with respect to each other, but this is not essential as the two longitudinal seals may also be superimposed, although the outermost longitudinal seal may then not extend to the innerside of the innermost tube.

Referring now to FIG. 3 a tube of non-woven material according to the present invention is made by applying a non-woven layer 14 upon a mandril 10 to form the innermost tube of non-woven material 2. Simultaneously with this procedure glue-applying members 9 locally apply a glue 6, melting in the presence of heat.

The first longitudinal seal 4 is formed in the non-woven 14 by means of a first ultrasonic sealing member 11 whereby an innermost non-woven tube 2 is obtained.

Subsequently another non-woven 15 is applied on the outerside of the innermost non-woven tube 2 for forming the outermost non-woven tube 3. Non-wovens 15 and 14 consist of a polyester or polypropylene fibrous material although other thermoplastic fibrous material may also be used for this purpose; the thickness of the non-woven 14 is e.g. 0.12 mm whilst the thickness of non-woven 15 amounts to e.g. 0.20 mm.

A second ultrasonic sealing member 12 applies the other longitudinal seal 5 in the other non-woven 15 to form the outermost non-woven tube 3. After the formation of said other longitudinal seal 5 the assembly is passed through an oven 16 in which the locally applied glue 6 is melted so that a fixation is accomplished of innermost non-woven tube 2 and outermost non-woven tube 3 surrounding the former.

The non-woven tube so obtained is subsequently passed in a membrane-applying member provided with an internal torpedo-shaped body 13 for applying a membrane of the desired thickness on the inner side of the non-woven tube. The membrane forming substance is e.g. a cellulose acetate solution but it goes without saying that use can also be made of solutions of polyamides, polyimides, polyvinylidene fluorides, polyacrylonitriles, polysulfones, polyeter sulfones, polyfenylene oxydes and the like.

Although the present invention has been shown and described in connection with a preferred embodiment thereof, it will be apparent to those skilled in the art that many variations and modifications may be made without departing from the invention in its broader aspects. It is therefore intended to have the appended claims cover all such variations and modifications as fall within the true spirit and scope of the invention.

What is claimed is:

1. A tube of a heat-sealable non-woven material comprising in a longitudinal direction a connecting seal obtained by ultrasonic sealing, said tube being a composite tube (1) and comprising at least an innermost non-woven tube (2) and another outermost non-woven tube (3) surrounding the innermost non-woven tube (2) and each comprising in a longitudinal direction an extending connecting seal, said non-woven tubes being mutually fixed against shifting with respect to each other and wherein the first connecting seal (4) of the innermost non-woven tube and another connecting seal (5) of the other outermost non-woven tube are positioned in a staggered manner with respect to each other, the innermost and the other outermost non-woven tube being locally interconnected by the influence of a heat melting glue, said composite tube being provided with a membrane (8) for membrane filtration, and the seal (5) in the outermost non-woven tube extending partially into the innermost tube by means of a region of interfused non-woven fibers of the innermost non-woven tube, said region not extending into the inner side of the innermost tube.

2. A Tube as claimed in claim 1, wherein the other outermost non-woven tube (3) is thicker than the innermost non-woven tube (2).

3. A tube as claimed in claim 2, wherein the thickness of the innermost non-woven tube with respect to the other outermost non-woven tube is in a ratio comprised between 1:1 to 1:3.

4. A tube as claimed in claim 1, wherein the other outermost non-woven tube (3) is thicker than the innermost non-woven tube (2).

5. A tube as claimed in claim 1 wherein the thickness of the innermost non-woven tube with respect to the other outermost non-woven tube is in a ratio comprised between 1:1 to 1:3.

* * * * *